United States Patent [19]

Ridland

[11] Patent Number: 4,774,288

[45] Date of Patent: Sep. 27, 1988

[54] RESIN CURE SYSTEM FOR HYDROGENATED NITRILE POLYMER

[75] Inventor: John J. Ridland, Sarnia, Canada

[73] Assignee: Polysar Limited, Sarnia, Canada

[21] Appl. No.: 936,389

[22] Filed: Dec. 1, 1986

[51] Int. Cl.$^4$ .............................................. C08L 61/00
[52] U.S. Cl. .................................. 525/133; 525/139; 525/940
[58] Field of Search ........................ 525/139, 133, 940

[56] References Cited

U.S. PATENT DOCUMENTS

| | | | |
|---|---|---|---|
| 2,726,224 | 12/1955 | Peterson et al. | 260/38 |
| 3,250,733 | 5/1966 | Giller | 525/133 X |
| 4,593,070 | 6/1986 | Oyama et al. | 525/139 |

FOREIGN PATENT DOCUMENTS 1558491 1/1980 United Kingdom .

OTHER PUBLICATIONS

Rubber Technology, 2nd Edition, New York: Van Nostrand Reinhold, 1973, pp. 261–262.

Primary Examiner—Theodore E. Pertilla
Attorney, Agent, or Firm—Stevens, Davis, Miller & Mosher

[57] ABSTRACT

The invention relates to a vulcanizable composition containing a partially hydrogenated nitrile polymer and a resin vulcanization system.

12 Claims, No Drawings

RESIN CURE SYSTEM FOR HYDROGENATED NITRILE POLYMER

This invention relates to vulcanizable polymer compositions comprising a hydrogenated copolymer of a conjugated diene and an $\alpha,\beta$-unsaturated nitrile and an active phenol-formaldehyde resin vulcanization system, the vulcanizates of which compositions exhibit good compression set properties and a good resistance to oils and good resistance to oxidative attack in air at elevated temperature aging under oxidizing conditions.

The effects of oxidizing conditions on vulcanizates obtained from polymers having carbon-carbon double bond unsaturation have long been a problem, particularly in applications where the vulcanizates are exposed to elevated temperatures for extended periods of time. A variety of approaches have been developed in the art in an attempt to solve this problem.

It is known that the carbon-carbon double bonds of such polymers activate the vulcanizate to oxidative attack. One solution to the problem of oxidative attack is to use polymers with few or no carbon-carbon double bonds. Examples of such polymers include butyl rubber (copolymers of isobutylene and isoprene) which typically contain about 0.5-3.0 mole percent of carbon-carbon double bond unsaturation, and ethylene-propylene copolymers which contain no such unsaturation.

Certain applications, such as the various hoses and seals in the engine compartment of automobiles, require vulcanized polymers with a combination of oil resistance, and resistance to oxidative attack in air at elevated temperatures for extended period of time. Vulcanizates of copolymers of conjugated dienes and $\alpha,\beta$-unsaturated nitriles, such as acrylonitrile-butadiene copolymer, commonly known as nitrile rubber or NBR, are well known for their oil resistance. However, they contain carbon-carbon double bond unsaturation and therefore are susceptible to oxidative attack unless subjected to special compounding procedures for the production of oxidation resistant vulcanizates.

In order to reduce the amount of carbon-carbon double bond unsaturation in NBR and yet retain the copolymer's oil resistance which is thought to be provided by the nitrile functional groups in the copolymer, methods have been developed to selectively hydrogenate the carbon-carbon double bond unsaturation of NBR without hydrogenating the nitrile groups as shown, for example, in British Pat. No. 1,558,491.

It is known to vulcanize butyl rubber using a reactive phenol-formaldehyde resin which contains reactive methylol groups, as disclosed in Rubbery Technology, 2nd ed., New York: van Nostrand Reinhold, 1973, p. 261-262. When the aforesaid reactive phenol-formaldehyde resin is used in the vulcanization of butyl rubber, a Lewis acid activator such as stannous chloride is normally also used.

Suprisingly, it has now been discovered that partially hydrogenated copolymers of conjugated dienes and unsaturated nitriles which contain from less than about 5 to about 0.05 mole percent carbon-carbon double bond unsaturation, may be vulcanized with a vulcanization system which includes a reactive phenol-formaldehyde resin and a Lewis acid activator to produce vulcanizates with good compression set properties and good resistance to air at elevated temperatures.

Accordingly, the present invention provides a vulcanizable polymer composition comprising (i) a copolymer of a $C_{4-6}$ conjugated diene and a $C_{3-5}$ $\alpha,\beta$-unsaturated nitrile, the carbon-carbon double bond unsaturation of the copolymer having been selectively hydrogenated such that the remaining unsaturation is from less than about 5 to about 0.05 mole percent of said copolymer and (ii) a vulcanization system comprising a reactive phenol-formaldehyde resin, a Lewis acid activator; and (iii) other conventional compounding ingredients.

The present invention also provides a process for preparing a vulcanization polymer composition comprising admixing (i) a copolymer of a $C_{4-6}$ conjugated diene and a $C_{3-5}$ $\alpha,\beta$-unsaturated nitrile, the carbon-carbon double bond unsaturation of the copolymer having been selectively hydrogenatd such that the remaining unsaturation is from less than about 5 to about 0.05 mole percent of the copolymer, (ii) a vulcanization system comprising a reactive phenol-formaldehyde resin and a Lewis acid activator, and (iii) other conventional compounding ingredients.

The present invention further provides a vulcanizate prepared by vulcanizing an admixture of (i) a copolymer of a $C_{4-6}$ conjugated diene and a $C_{3-5}$ $\alpha,\beta$-unsaturated nitrile, the carbon-carbon double bond unsaturation of the copolymer having been selectively hydrogenated such that the remaining unsaturation is from less than about 5 to about 0.05 mole percent of the copolymer, (ii) a vulcanization system comprising a reactive phenol-formaldehyde resin and a Lewis acid activator, and (iii) other conventional compounding ingredients.

In the copolymers used in the present invention, suitable $C_{4-6}$ conjugated dienes include butadiene, isoprene and pipenylene. Butadiene is preferred. Suitable $C_{3-5}$ nitriles include acrylonitrile and methacrylonitrile. Solid copolymers of butadiene and acrylonitrile are preferred. These copolymers generally contain from about 15 to about 50 percent of butadiene and from about 25 to about 45 percent by weight of acrylonitrile.

These copolymers may be selectively hydrogenated using the process described in British Pat. No. 1,558,491 or other processes known to the art. The amount of carbon-carbon double bond unsaturation remaining following hydrogenation must be controlled. It has been found that if the remaining unsaturation is less than about 7 mole percent of the copolymer, then the vulcanizates obtained from the copolymers have good compression set properties, and also retain elastomeric properties when exposed to air at elevated temperatures for extended periods of time. While not wishing to be bound by any particular theory, it is believed that sufficient unsaturation must remain to provide enough sites in the copolymer for reaction with the vulcanization system to allow a sufficient degree of crosslinking upon vulcanization and thereby provide suitable properties of the vulcanizate. It has been found that a practical minimum amount of retained unsaturation is about 0.05 mole percent of the copolymer. Thus, the remaining carbon-carbon double bond unsaturation in the copolymer should be from less than about 7 to about 0.05 mole percent of the copolymer.

The vulcanization system used in the present invention must contain a reactive phenol-formaldehyde resin and a Lewis acid activator. It is known to those skilled in the art that reactive phenol-formaldehyde resins may be prepared by reacting a para-substituted phenol with a molar excess of formaldehyde, as disclosed in U.S. Pat. No. 2,726,224. The use of such phenol-formaldehyde resins in vulcanization systems for butyl rubber is well known.

The vulcanization system used in the present invention preferably contains at least 3 parts by weight reactive phenol-formaldehyde resin per 100 parts by weight polymer. It is especially preferred to use from 8-16 parts of the reactive phenol-formaldehyde resin per 100 parts by weight polymer. If more than 16 parts by weight of the resin are employed, the entire compound tends to become resinous, and hence such high levels of resin are undesirable.

The Lewis acid activator may be present as a separate component such as stannous chloride ($SnCl_2$) or polychloro-butadiene. Alternatively, the Lewis acid activator may be present within the structure of the resin itself - for example, bromomethylated alkyl phenol-formaldehyde resin (which may be prepared by replacing some of the hydroxyl groups of the methylol group of the resin shown above with bromine). The use of such halogenated resins in vulcanization systems for butyl rubber is well known to those skilled in the art.

The polymer compositions of the present invention may be heated to form vulcanizates using conventional procedures well known in the art. Suitable temperatures are from about 135° to about 200° C., preferably from about 150° to about 180° C., for periods of from about 2 minutes to about 15 hours, preferably from about 5 minutes to about 30 minutes.

In the process of the present invention, the hydrogenated copolymer and the reactive phenol-formaldehyde resin and Lewis acid activator may be admixed in any manner known to the art for use with conventional non-hydrogenated elastomers, for example on a two-roll rubber mill or an internal mixer. The hydrogenated copolymer used in the process of the present invention tends to be quite stiff, and is prone to bag when mixed on a two-roll rubber mill. The addition of a reactive phenol-formaldehyde resin improves the mixing of the hydrogenated copolymer by reducing the bagging problem.

Other conventional compounding ingredients may also be included by mixing with the copolymer in the conventional manner. Such other compounding ingredients are used for their conventional purposes and include activators such as zinc oxide and magnesium oxide; stearic acid; plasticizers; processing aids; reinforcing agents; fillers; promoters and retarders in amounts well known in the art.

The polymer compositions of the present invention on vulcanization exhibit a surprising combination of good compression set properties, resistance to oils and resistance to oxidative attack in air at elevated temperatures for extended periods of time.

The following examples illustrate the present invention but are not intended to be limiting.

EXAMPLE 1

A partially hydrogenated acrylonitrile-butadiene polymer containing approximately 38 weight percent acrylonitrile and approximately 2 mole percent carbon-carbon double bond unsaturation was mixed on a hot, two roll mill. The elastomer mixture was stiff, boardy and bagged on the mill.

Eight parts of a bromomethylated alkylphenol formaldehyde resin were added to the elastomer. The resin visually appeared to disperse well in the elastomer, and the bagging problem was eliminated.

EXAMPLE 2

The following procedure was used for each of the experiments of this example.

The basic recipe used for each experiment was as follows:
Polymer: 100 parts
Stearic acid: 1 part
Zinc oxide: 5 parts
N550 carbon black: 50 parts
Vulcanization system: as shown in Table 1

All of the mixtures of this example were mixed in a banbury mixture. The mixtures were vulcanized at 180° C. for the time periods shown in Table 1. The physical properties of the vulcanizates were tested according to ASTM standards.

Tensile properties, including tensile stress (usually known as modulus) at 100 percent and 300 percent elongation, and at rupture ("tensile strength") were determined according to ASTM D412-80. Hardness properties were determined using a Type A Shore durometer according to ASTM-D2240-81. Hot air aging was completed according to ASTM-D865-81.

Compression set was determined according to ASTM-D395-84.

The resin identified as resin 1 in this example, and the following examples, is a reactive bromomethylated alkylphenol formaldehyde resin, sold under the trade name SP1055 by Schenectady Chemicals.

The resin identified as resin 2 in this example, and the following examples, is a reactive alkylphenol formaldehyde resin, sold under the trade name SP1045 by Schenectady Chemicals.

The polymer used in each experiment of Example 2 was a hydrogenated acrylonitrile-butadiene rubber containing approximately 38 weight percent acrylonitrile and having less than 0.5 mole percent carbon-carbon double bond unsaturation.

Data from the experiments of this example are shown in Table 1. The data clearly shows that vulcanizates prepared according to the present invention demonstrate good resistance to hot air aging. Also, the compression set data from inventive experiments 1 through 5 clearly show the good compression set properties of vulcanizates of the present invention in comparison to the compression set of the vulcanizate of comparative experiment 6.

TABLE 1

| Vulcanization System | Experiment | | | | | |
|---|---|---|---|---|---|---|
| | 1 | 2 | 3 | 4 | 5 | 6 |
| Resin 1 | 4 | 8 | 12 | — | — | — |
| Resin 2 | — | — | — | 4 | 12 | — |
| $SnCl_2$ | — | — | — | 2 | 2 | — |
| Sulfur | — | — | — | — | — | 1.5 |
| MBTS[a] | — | — | — | — | — | 1.5 |
| TMTM[b] | — | — | — | — | — | 3 |

TABLE 1-continued

| Vulcanization | Experiment | | | | | |
|---|---|---|---|---|---|---|
| System | 1 | 2 | 3 | 4 | 5 | 6 |
| Scorch Time (min. at 125° C.) | 30+ | 30+ | 30+ | 30+ | 16.0 | 30+ |
| Cure, Min. at 180° C. | 37 | 33 | 24 | 42 | 19 | 45 |
| Hardness ° Shore A | 74 | 75 | 75 | 76 | — | 72 |
| Modulus at 100% elongation (MPa) | 2.7 | 3.9 | 5.9 | 3.6 | 7.4 | 2.2 |
| Modulus at 300% elongation (MPa) | 7.7 | 14.7 | 22.9 | 11.5 | 26.1 | 6.9 |
| Tensile Strength (MPa) | 10.2 | 22.4 | 26.6 | 15.0 | 26.8 | 9.9 |
| Elongation (%) | 540 | 560 | 405 | 520 | 320 | 640 |
| Compression Set % (Cure Sheet Cure + 10 min.) | | | | | | |
| 70 hr at 100° C. | 92 | 50 | 30 | 76 | 28 | * |
| 70 hr at 150° C. | 93 | 71 | 58 | 91 | * | 103 |
| Physical Properties - Aged in air at 150° C. for 168 hours | | | | | | |
| Hardness ° Shore A/pts | 80 | 82 | 83 | 83 | 85 | 78 |
| Modulus at 100% Elongation (MPa) | 6.9 | 12.6 | 18.1 | 14.2 | 24 | 4.6 |
| Modulus at 300% Elongation (MPa) | 20.7 | 26.4 | 26.2 | 24.3 | 27.3 | 17.5 |
| Elongation (%) | 360 | 240 | 160 | 175 | 120 | 480 |

<sup>a</sup>MBTS = benzothiazyl disulfide
<sup>b</sup>TMTM = tetra methyl thiuram monosulfide
*not measured

EXAMPLE 3

The procedures and basic recipe previously described in Example 2 were used to complete the experiments of Example 3, with the vulcanization systems and cure times as shown in Table 2.

The polymer used in the experiments of Example 3 was a hydrogenated acrylonitrile-butadiene rubber containing approximately 38 percent by weight acrylonitrile and having approximately 6 mole percent carbon-carbon double bond unsaturation.

Data from the experiments of this example are shown in Table 2. The data from experiments 8 through 10 further demonstrate that vulcanizates prepared according to the present invention have good compression set properties, and good resistance to hot air aging. The compression set of the vulcanizate of comparative experiment 14 is inferior to the compression set of inventive examples 9, 10, 12 and 13.

TABLE 2

| Vulcanization | Experiment | | | | | | |
|---|---|---|---|---|---|---|---|
| System | 8 | 9 | 10 | 11 | 12 | 13 | 14 |
| Resin 1 | 4 | 8 | 12 | — | — | — | — |
| Resin 2 | — | — | — | 4 | 8 | 12 | — |
| SnCl₂ | — | — | — | 2 | 2 | 2 | — |
| Sulfur | — | — | — | — | — | — | 1.5 |
| MBTS-a | — | — | — | — | — | — | 1.5 |
| TMTM-b | — | — | — | — | — | — | 0.3 |
| Scorch Time (min. at 125° C.) | 30+ | 25.4 | 12.8 | 17.8 | 12 | 10.8 | 17.6 |
| Cure, Min. at 180° C. | 25 | 16 | 13 | 25 | 14 | 13 | 6 |
| Hardness ° Shore A | 69 | 71 | 71 | 69 | 71 | 74 | 72 |
| Modulus at 100% Elongation (MPa) | 2.9 | 5.5 | 6.8 | 3.5 | 5.5 | 7.3 | 3.4 |
| Modulus at 300% Elongation (MPa) | 13.5 | 21.8 | 25.5 | 15.3 | 22.7 | — | 15.1 |
| Tensile Strength (MPa) | 20.0 | 25.7 | 26.1 | 24.8 | 24.7 | 23.7 | 23.8 |
| Elongation (%) | 580 | 380 | 310 | 570 | 340 | 270 | 560 |
| Compression Set % (Cure Sheet Cure + 10 min.) | | | | | | | |
| 70 hr at 100° C. | 42 | 22 | 17 | 47 | 26 | 20 | * |
| 70 hr at 150° C. | * | 55 | 52 | * | 50 | 54 | 83 |
| Physical Properties - Aged in air at 150° C. for 168 hours | | | | | | | |
| Hardness ° Shore A/pts | 77 | 79 | 78 | 80 | 82 | 85 | 86 |
| Modulus at 100% Elongation (MPa) | 8.5 | 15.7 | 20.1 | 14.1 | 18.5 | 26.1 | 12.5 |
| Modulus at 300% Elongation (MPa) | 24.3 | 26.1 | 26.6 | 26.4 | 24.4 | 26.1 | 22.4 |
| Elongation (%) | 240 | 170 | 130 | 170 | 130 | 100 | 170 |

*not measured

EXAMPLE 4

This examples relates to the use of a reactive phenol-formaldehyde resin, in conjunction with a Lewis acid donor (in which the Lewis acid donor is a separate component from the resin) in a vulcanization system for a partially hydrogenated acrylonitrile-butadiene polymer containing approximately 38 weight percent acrylonitrile and having less than 0.5 mole percent carbon-carbon double bond unsaturation. The procedures and basic recipe previously described in example 2 were used to complete the experiments of Example 4, with the vulcanization systems and cure times as shown in Table 3.

The Lewis acid donor used in inventive experiment 15 was stannous chloride. A poly-chlorobutadiene polymer ("chloroprene") sold under the trade name Neoprene W by Dupont Limited was used as a Lewis acid donor in inventive experiment 16. A brominated isoprene-isobutylene elastomer ("brominated butyl rubber") sold under the tradename POLYSAR® bromobutyl X2 by Polysar Limited, was used as a Lewis acid donor in inventive experiment 17.

The data shown in Table 3 demonstrates that brominated butyl rubber, stannous chloride and chloroprene may be used in accordance with the present invention to produce vulcanizates with good compression set and good resistance to hot air aging.

TABLE 3

| Vulcanization System | Experiment | | |
|---|---|---|---|
| | 15 | 16 | 17 |
| Resin 2 | 8 | 8 | 8 |
| SnCl$_2$ | 2 | — | — |
| Chloroprene | — | 5 | — |
| Brominated butyl rubber | — | — | 5 |
| Scorch Time (min. at 125° C.) | 15.8 | 30+ | 30+ |
| Cure, Min. at 180° C. | 27 | 60 | 60 |
| Hardness ° Shore A | 76 | 72 | 73 |
| Modulus at 100% Elongation (MPa) | 5.2 | 3.3 | 3.3 |
| Modulus at 300% Elongation (MPa) | 21.4 | 12.6 | 12.5 |
| Tensile Strength (MPa) | 25.7 | 20.4 | 20.5 |
| Elongation (%) | 430 | 580 | 600 |
| Compression Set % (Cure Sheet Cure + 10 min.) | | | |
| 70 hr at 100° C. | 36 | 60 | 62 |
| 70 hr at 150° C. | 56 | 74 | 72 |
| Physical Properties - Aged in air at 150° C. for 168 hours | | | |
| Hardness ° Shore A/pts | 83 | 87 | 82 |
| Modulus at 100% Elongation (MPa) | 20.5 | 2.4 | 9.9 |
| Tensile (MPa) | 26.1 | 24.7 | 24.0 |
| Elongation % | 140 | 110 | 250 |

What is claimed is:

1. A vulcanizable polymer composition comprising (i) 100 parts by weight of a copolymer of a C$_{4-6}$ conjugated diene and a C$_{3-5}$ α,β-unsaturated nitrile, the carbon-carbon double bond unsaturation of said copolymer having been selectively hydrogenated such that the remaining carbon-carbon double bond unsaturation is from less than about 5 to about 0.05 mole percent and (ii) 3 to 16 parts by weight of a vulcanization system comprising a reactive phenol-formaldehyde resin and a Lewis acid activator.

2. The composition according to claim 1 wherein said conjugated diene is butadiene and said nitrile is acrylonitrile.

3. The composition according to claim 1 wherein said Lewis acid activator is stannous chloride.

4. The composition according to claim 1 wherein said Lewis acid activator is selected from polychlorobutadiene polymer and brominated isoprene-isobutylene elastomer.

5. A process for preparing a vulcanizable polymer composition comprising admixing (i) 100 parts by weight of a copolymer of a C$_{4-6}$ conjugated diene and a C$_{3-5}$ α,β-unsaturated nitrile, the carbon-carbon double bond unsaturation of said copolymer having been selectively hydrogenated such that the remaining carbon-carbon double bond unsaturation is from less than about 5 to about 0.05 mole percent and (ii) 3 to 16 parts by weight of a vulcanization system comprising a reactive phenol-formaldehyde resin and a Lewis acid activator.

6. The process according to claim 5 wherein said conjugated diene is butadiene and said nitrile is acrylonitrile.

7. The process according to claim 5 wherein said Lewis acid activator is stannous chloride.

8. The process according to claim 5 wherein said Lewis acid activator is selected from polychlorobutadiene polymer and brominated isoprene-isobutylene elastomer.

9. A vulcanizate prepared by vulcanizing an admixture of (i) 100 parts by weight of a copolymer of a C$_{4-6}$ conjugated diene and a C$_{3-5}$ α,β-unsaturated nitrile, the carbon-carbon double bond unsaturation of said copolymer having been selectively hydrogenated such that the remaining carbon-carbon double bond unsaturation is from less than about 5 to about 0.05 mole percent and (ii) 3 to 16 parts by weight of a vulcanization system comprising a reactive phenol-formaldehyde resin and a Lewis acid activator.

10. The composition of claim 1 further comprising conventional compounding ingredients selected from plasticizers, processing aids, reinforcing agents and fillers.

11. The process of claim 5 wherein said composition further comprises conventional compounding ingredients selected from plasticizers, processing aids, reinforcing agents and fillers.

12. The vulcanizate of claim 9 wherein said admixture further comprises conventional compounding ingredients selected from activators, plasticizers, processing aids, reinforcing agents and fillers.

* * * * *